Sept. 19, 1961   R. W. HEER ET AL   3,000,649
COUPLINGS FOR SECTIONAL HEAVY DUTY APPARATUS
Filed Jan. 4, 1961   4 Sheets-Sheet 1
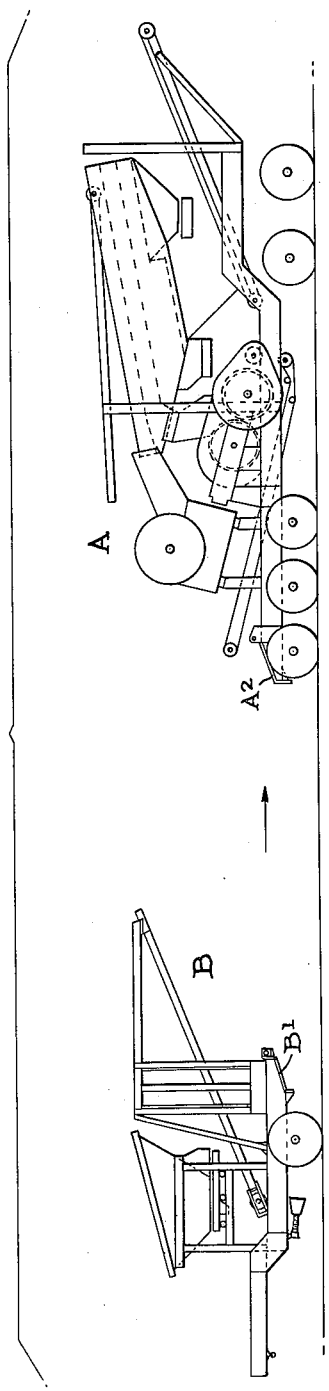
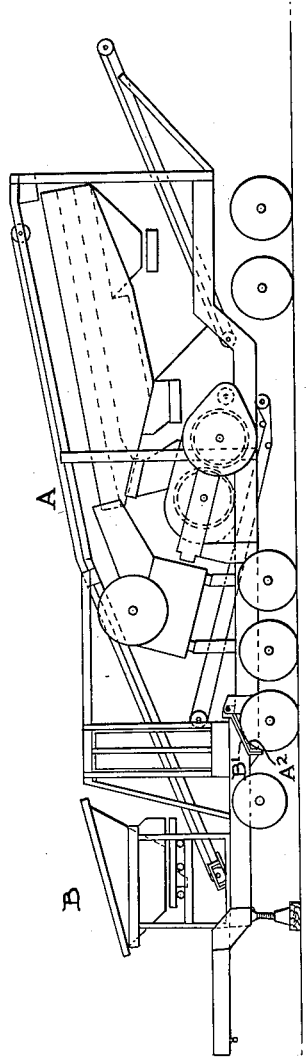
INVENTORS
RALPH W. HEER
DEAN T. OTTO
L. W. MUNDY
BY
ATTORNEY

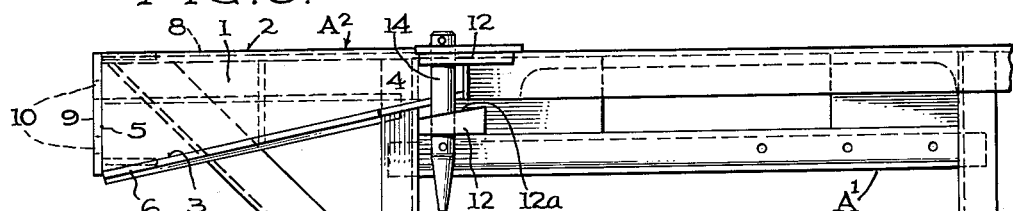
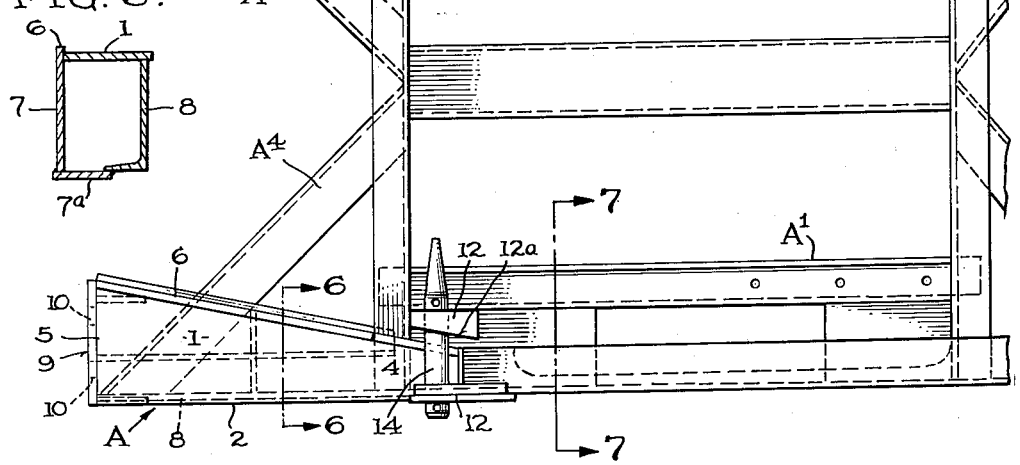
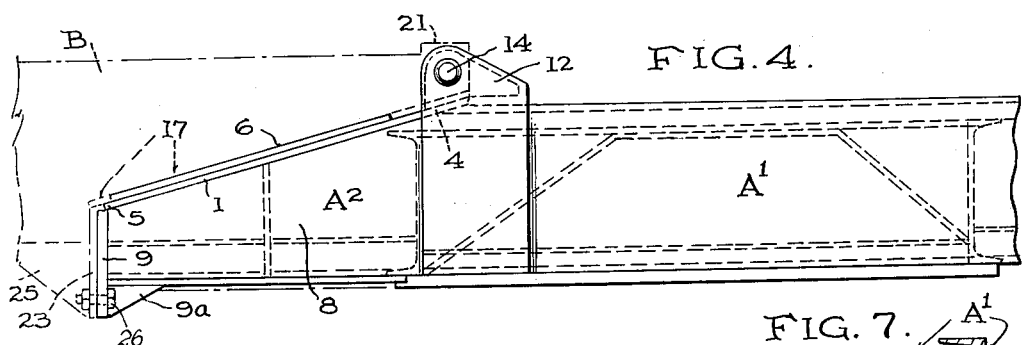
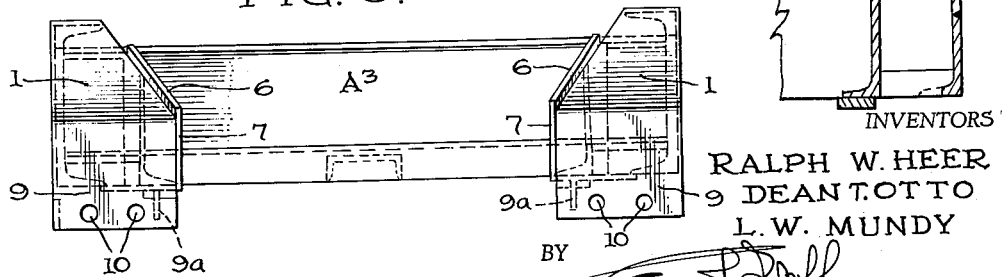

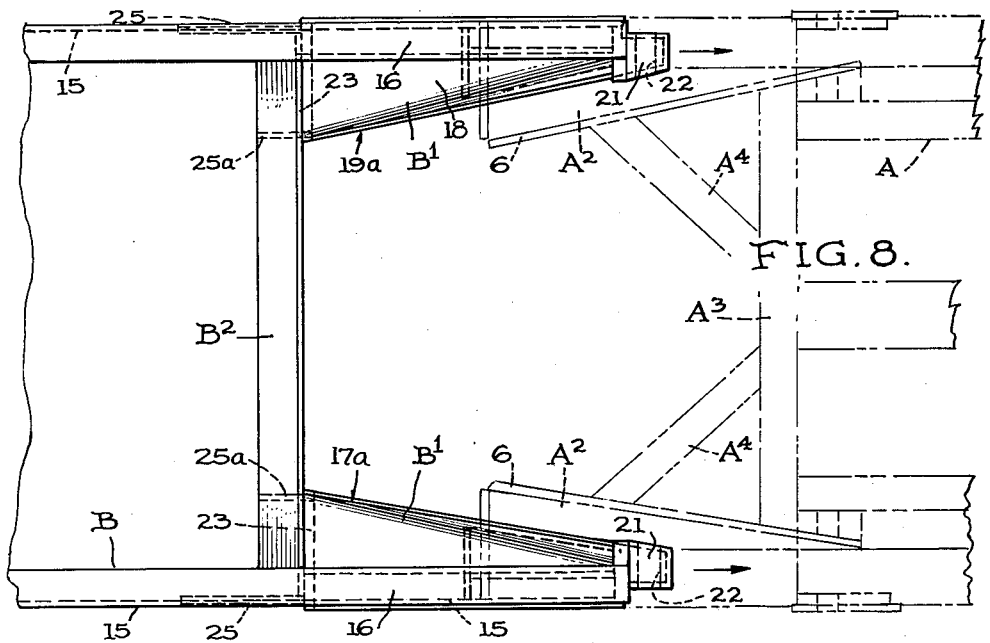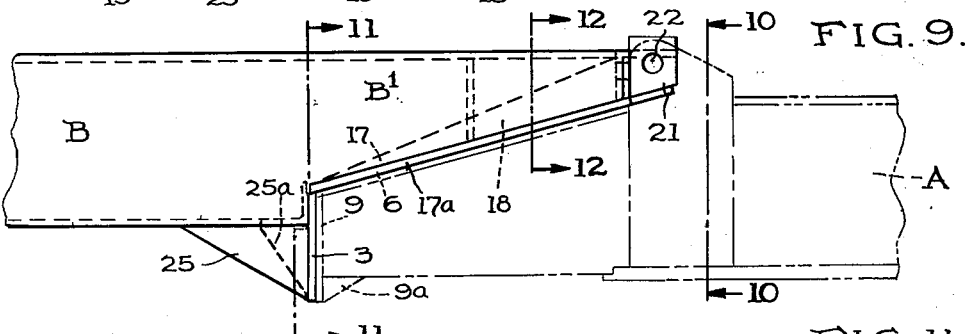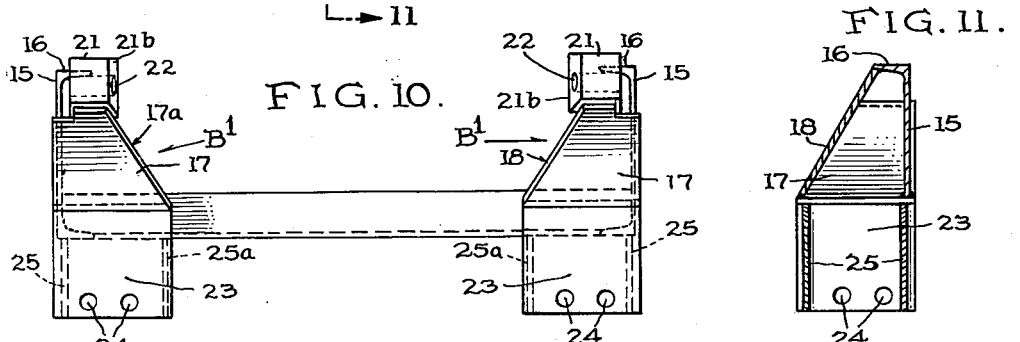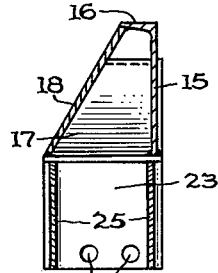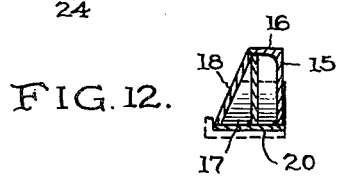

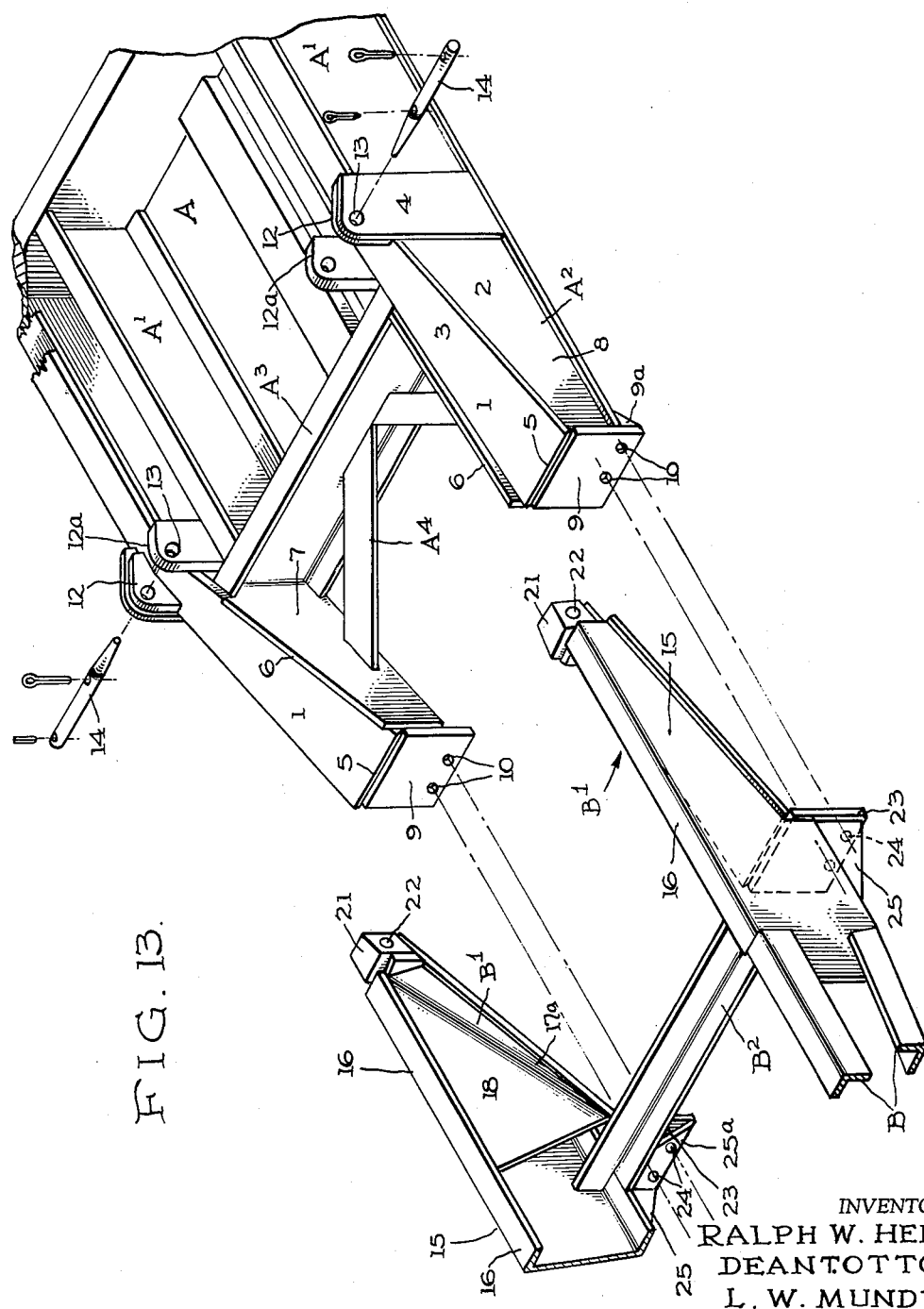

United States Patent Office 3,000,649
Patented Sept. 19, 1961

3,000,649
COUPLINGS FOR SECTIONAL HEAVY
DUTY APPARATUS
Ralph W. Heer, Dean T. Otto, and Lloyd W. Mundy, Minneapolis, Minn., assignors to Poor & Company, Chicago, Ill., a corporation of Delaware
Filed Jan. 4, 1961, Ser. No. 80,574
6 Claims. (Cl. 280—106)

This invention relates to a practical coupling arrangement for the sections of apparatus which would otherwise be too heavy as a unit to be transported over automotive highways.

Ground transportation for commercial use today aside from the infant and more or less experimental ground effects machines, is accomplished largely by rubber-tired motor vehicles traveling over especially prepared highways or freight cars traveling on rails. The latter have the advantage in the respect that loads of great magnitude can be carried at high speeds over great distances on steel rails because the total load is distributed at spaced intervals in predetermined safe unit limits by individual cars coupled together to form a train. On the other hand, the essential objective to construct many highway transportable units to obtain maximum capacity for the uses sought and maximum efficiency required to meet production schedules at minimum competitive costs, results in problems of concentrated weight that are not compatible with safe load limts of roads made of concrete, asphalt, or a combination of both.

For example, crushing plants including rock crushers, grading screens, conveyors for supplying pit run material to the crushers and screens, are, because of the rough and heavy work which they must perform, of necessarily great weight. Thus, in attaining operating stability, devices of this type are inherently so heavy that, if they were shipped as a single unit the load would be too great for the roadway. For this reason it is essential to split up apparatus into separate sections which are in themselves of lighter weight to enable them to be moved on their own wheels from one operating site to the other over highways whose load capacity is within the safety limit provided by the specifications of the road. Moreover, sections of this type must be able to be connected in the field, at the point of use, by available means.

Accordingly, one of the objects of the present invention is to provide an earthworking plant, such as a crushing plant, whose frame is split into two sections, the adjacent ends of said sections being provided with special mating coupling means which may be rendered effective by merely moving one section toward the other by available equipment such as a heavy truck, bulldozer or the like and without the necessity of using a crane which normally has little or no utility in the vicinity of a rock crushing site.

A further object of the invention is to provide a coupling which not only aligns the two sections by mere longitudinal movement between them, but which also in use provides an extraordinarily stable and steady connection so that the sections will remain properly connected during use, notwithstanding the extraordinary vibration generated during the operation of an apparatus of this kind.

A still further object of the invention is to provide a construction which may be readily fabricated during the construction of the apparatus.

With the above and other objects in view which will appear as the nature of the invention is better understood, the invention consists in the novel construction, combination, and arrangement of parts, hereinafter more fully described, illustrated and claimed.

A preferred and practical embodiment of the invention is shown in the accompanying drawings, in which:

FIGURE 1 is a schematic view showing the two sections of the apparatus as they appear disconnected for highway travel.

FIGURE 2 is a schematic side elevation showing the sections connected for operation at the site of use.

FIGURE 3 is a top plan view of the coupling means on the main section.

FIGURE 4 is a side elevation of the construction shown in FIGURE 3.

FIGURE 5 is a rear end elevation of the main coupling means shown in FIGURES 3 and 4.

FIGURE 6 is a vertical cross sectional view taken on the line 6—6 of FIGURE 3.

FIGURE 7 is a vertical sectional view taken on the line 7—7 of FIGURE 3.

FIGURE 8 is a top plan view of the coupling means carried by the trailing section, with the mating coupling means of the main section (FIG. 3) shown in dotted lines.

FIGURE 9 is a side elevation of the construction shown in FIGURE 8.

FIGURE 10 is a rear end elevation of the trailing section as shown on the line 10—10 of FIGURE 9.

FIGURE 11 is a vertical cross sectional view taken on the line 11—11 of FIGURE 9.

FIGURE 12 is a vertical cross-sectional view taken on the line 12—12 of FIGURE 9.

FIGURE 13 is an exploded perspective view of the coupling means on the rear end of the main section and the mating coupling means on the trailing section in a position where they are about to be engaged.

Similar reference characters designate corresponding parts throughout the several figures of the drawings.

Referring first to FIGURES 1 and 2, it will be seen that the main section A includes the screen frame, the crushing means, and part of the conveyor mounted on a wheeled chassis adapted to be towed by a suitable tractor.

The trailing section is designated generally as B and includes, for example, a frame normally disposed at a lower level than the frame of section A, a bucket wheel, a mechanical feeder, and also a portion of the feed conveyor mounted on a suitable wheeled frame which although normally disposed at the same level as the frame of section A, nevertheless becomes lifted relative to the frame of said section A by the coupling operation to aid in rigidly uniting the sections as will later appear.

In coupling the two units A and B together, the rear section B will be towed by a fifth wheel type tractor, and, consequently, the jack cannot be used until the tractor has been pulled away. The purpose of the jack is to support the unit when the tractor is not present. The reason for the wheel on the rear section B being elevated is so that the entire unit may be moved in the coupled position without the rear section wheel dragging on the ground.

As will be observed from comparing FIGURES 1 and 2, the trailing section B may be moved toward the main section A until they meet, whereupon the two sections automatically interfit and may be secured against separation to insure holding the wedgedly connected sections together in a positive manner and provide stable operating conditions.

Referring first to the main section A, it will be seen from FIGURES 3 to 7 and 13 that the same includes the side frames $A^1$ made of heavy structural members and a set of rearwardly extending coupling arms designated generally as $A^2$. As shown, these arms are connected to the transverse frame member $A^3$ by suitable braces $A^4$.

The coupling arms $A^2$ are structurally substantially the same, and, therefore, a description of one will suffice for the other.

Each of the coupling arms $A^2$ is of box type in transverse cross section and includes top, bottom and side walls. The top wall is in the form of an upper supporting plate 1 whose bearing surface is defined by side edges 2 and 3 diverging rearwardly thereby providing a narrow front end 4 and a wide rear end 5. The inner edges 3 of the arms $A^2$ are provided with upstanding guide flanges 6 which in the example shown are conveniently formed by the upper edge of the inner wall or plate 7. As will be seen from FIG. 6 this plate, forming the inner wall portion of said arms, has its lower edge welded to the horizontal filler plate $7^a$ which in turn is welded to the related flange of the outer wall 8. The wall 8 may be a continuation of the web of frame $A^1$. The rear wide end 5 of each top wall or supporting plate 1 joins with a vertical abutment plate 9 provided at its lower edge portion with bolt openings 10.

It will also be observed from FIGURES 3–7 and FIGURE 13, that the upper narrow end 4 of the top wall supporting surface 1 is provided at each side thereof with a pair of laterally spaced upstanding coupling ears 12 having registering holes 13 for receiving locking pins 14 when the rear section B has been moved into coupling position, as will presently appear. The inner ear is preferably supplemented by a shim having a tapered inner face $12^a$ to provide a wedge shaped socket with respect to the opposite ear.

Referring to the mating or complementary coupling means on the rear or trailing section B, it will be observed that the set of coupling arms $B^1$ are also of box type in transverse section to provide maximum rigidity and strength and include top, bottom and side walls. As shown, these walls are formed by outer structural members 15 (FIGS. 10–12), and have upper flanges 16 and the bottom bearing plates 17 (FIGS. 8–13) which slope upwardly from the bottom portions of the side members 15 and which converge from rear to front in a manner to mate and register with and rest upon the rearwardly diverging supporting surfaces of plates 1—1 of the main frame section A.

In addition, the rear coupling arms $B^1$ are rigidly spaced laterally by cross brace $B^2$ and are each provided with the inner obliquely disposed reinforcing gusset plate 18. Adjacent their forward ends, said arms are each provided with an internal vertical reinforcing plate 20 disposed between the bottom plate 17 and the top portion 16. It will now be seen that the front ends of the arms $B^1$ on the main section B are made especially strong to carry the coupling block 21 at the front ends thereof.

Each coupling block is provided with an opening 22 and when the blocks are placed between the upstanding ears 12, the holes 22 and 13 register to receive the related coupling pin 14 when the two sections are to be securely assembled together. Also, the inner face $21^b$ of each block is tapered to mate with and wedge against the face $12^a$ of the related outer ear 12 on the main section.

With further reference to the trailing section B, it will be noted that the inner edge portion $17^a$ of the bottom plate 17 of arm $B^1$ has guiding and wedging engagement with the upstanding flange 6 on the related arms $A^2$ of the main section.

The block 21 is securely welded to the front end of the plate 17 and the oblique gusset 18 as well as to a portion of the outer wall 15. When this block enters between paired ears 12—12, it becomes firmly wedged between the ears and is so maintained by the related pin 14.

The rear end portion of each wedge shaped and upwardly sloping bottom plate 17 which is superimposed on the mating faces 1 of the arms $A^2$ terminates in a vertical abutment plate 23 provided with holes 24 which will register with the holes 10 so that when the adjacent surfaces of plates 9 and 23 are in flushly abutting relation, fastening bolts 26 (FIG. 4) can be applied to augment resistance to longitudinal separation of the main and trailing sections which are also locked because of the pins 14 holding the parts 12 and 21 together. The abutment plates 23 are supported on the forwardly extending arms $B^1$ of the rear section B by the gusset plates 25—$25^a$ which are deeper than their counterparts $9^a$ and the arms $A^2$ because in the latter case the rear end of each side wall is deeper than the front end of each forwardly extending arm $B^1$.

From the foregoing it will now be seen that because of the mating tapering surfaces on the related complementary coupling arms and the means for locking the arms together, and exceptionally stable connection is provided between the two units of the apparatus.

For example, there is provided structure including four parts which all mutually and simultaneously contribute to a rigid coupling that eliminates play which otherwise amplified by vertical, lateral, or other vibrating or shaking forces, would severely damage the apparatus and interfere with its intended accurate performance. These parts are the surfaces of plates 1 and 17, with their matching lateral wedging surfaces; the guide flanges 6 disposed oblique to the line of coupling movement; the blocks 21; and their related ears 12, having mutually wedging surfaces.

It will, of course, be understood that in use the rear and trailing section B of the apparatus may be supported on jacks, to lift the wheels off the ground because of differential level between the main side frames of sections A and B.

We claim:
1. Coupling means for the sections of heavy duty crushing plants and the like which are too heavy for highway travel, comprising, a main section including a frame, laterally spaced rearwardly extending coupling arms on the frame of said main section having upper rearwardly diverging and downwardly inclined supporting surfaces presenting a narrow forward end and a relatively wide rear end, spaced pin receiving ears at the narrow ends of said supporting surfaces and having transversely alined openings, vertical abutment plates at the wide end of said supporting surfaces;

a trailer section including a frame, spaced forwarding extending arms on the frame of said trailer section, said arms having upwardly inclined forwardly converging bearing surfaces for registering with and resting on said supporting surfaces of the arms of the main section, vertical abutment plates at the rear end of said last named arms and adapted for flush engagement with said abutment plates on the first named arms, and a coupling block at the front end of each of said forwardly extending arms detachably disposed between the said pin receiving ears and each having an opening registering with the related opening of said ears to receive a fastening pin.

2. Coupling means according to claim 1, wherein the rearwardly extending arms of the main section and the forwardly extending arms of the trailer section are both of box-type transverse section for stabilizing the coupling under forces of vibration.

3. Coupling means according to claim 1, wherein the rearwardly extending coupling arms include top and bottom walls and outer and inner side walls, said top walls having the said rearwardly diverging and downwardly inclined supporting surfaces and the upper edges of the inner walls project above the plane of said surfaces to provide a wedging surface for the related edge portions of the forwardly extending arms of the trailer section and braces connect the inner walls with the main section.

4. Coupling means according to claim 1, wherein the vertical abutment plates of the rearwardly and forwardly extending coupling arms have openings fitted with bolts to supplement the securing effect of the pins.

5. Coupling means according to claim 1, wherein each coupling block has at least one wedge face cooperating with a wedge face on a related ear.

6. Coupling means for the sections of heavy duty apparatus too heavy for highway travel, comprising, in combination, main and trailing sections, a rearwardly extending set of coupling arms on the main section having downwardly inclined and rearwardly diverging supporting surfaces, coupling ears disposed in spaced pairs at the upper end of said surfaces, wedge means on the inner face of at least one of the ears of each pair, a forwardly extending set of coupling arms on the trailing section and each having upwardly inclined and forwardly converging supporting surfaces for matching with and resting on the said supporting surfaces of the rearwardly extending coupling arms, coupling blocks on the ends of said forwardly extending arms, means for connecting said coupling ears and blocks, and means for connecting the ends of both sets of arms at the ends opposite the ears and blocks.

References Cited in the file of this patent

UNITED STATES PATENTS

| | | |
|---|---|---|
| 2,871,027 | Brockman | Jan. 27, 1959 |
| 2,952,476 | Brockman | Sept. 13, 1960 |